United States Patent [19]

Barr et al.

[11] Patent Number: 5,061,293

[45] Date of Patent: Oct. 29, 1991

[54] CUTTING ELEMENTS FOR ROTARY DRILL BITS

[76] Inventors: John D. Barr, 2 Charlton Park Gate, Cheltenham, Gloucestershire, England; Thomas A. Newton, Jr., 8020 Braesmain #2004, Houston, Tex. 77025

[21] Appl. No.: 523,322

[22] Filed: May 14, 1990

Related U.S. Application Data

[62] Division of Ser. No. 333,120, Apr. 4, 1989.

[51] Int. Cl.$^5$ .............................................. B24D 3/00
[52] U.S. Cl. .......................................... 51/293; 51/295
[58] Field of Search .......................... 51/293, 295, 297

[56] References Cited

U.S. PATENT DOCUMENTS

| | | | |
|---|---|---|---|
| 4,219,339 | 8/1980 | Wilson | 51/307 |
| 4,225,322 | 9/1980 | Knemeyer | 51/295 |
| 4,255,165 | 3/1981 | Dennis et al. | 51/309 |
| 4,259,090 | 3/1981 | Bovenkerk | 51/309 |
| 4,539,018 | 9/1985 | Whanger et al. | 51/295 |
| 4,694,918 | 9/1987 | Hall | 51/293 |
| 4,995,887 | 2/1991 | Barr et al. | 51/293 |

Primary Examiner—William R. Dixon, Jr.
Assistant Examiner—Willie J. Thompson
Attorney, Agent, or Firm—Browning, Bushman, Anderson & Brookhart

[57] ABSTRACT

A preform cutting element for a rotary drill bit includes a layer of polycrystalline diamond material, the rear face of which is bonded to the front face of a backing layer of less hard material, such as tungsten carbide. The rear face of the backing layer is substantially greater in area than the rear face of the diamond layer. A method of manufacturing such cutting elements comprises forming an intermediate structure comprising polycrystalline diamond material bonded between two outer layers of tungsten carbide, and then cutting the intermediate structure to provide two pieces, each of the pieces including part of the diamond material and at least a major part of a respective one of the two outer layers.

7 Claims, 5 Drawing Sheets

CUTTING ELEMENTS FOR ROTARY DRILL BITS

This is a division of application Ser. No. 07/333,120, filed Apr. 4, 1989, pending.

BACKGROUND OF THE INVENTION

The invention relates to cutting elements for rotary drill bits for drilling or coring holes in subsurface formations. It relates in particular to drill bits which comprise a bit body having a shank for connection to a drill string, an operating end face on which are mounted a plurality of so-called "preform" cutting elements, and a passage for supplying drilling fluid to the operating face of the bit for cooling and/or cleaning the cutting elements.

Each preform cutting element comprises a thin layer of polycrystalline diamond or other superhard material bonded to a less hard backing layer, usually tungsten carbide. The two-layer arrangement of the cutting element provides a degree of self-sharpening since, in use, the less hard backing layer wears away more easily than the harder cutting layer. The preform cutting elements are usually mounted on the bit body by being bonded, for example by brazing, to a carrier, which may be in the form of a stud of tungsten carbide which is secured in a socket in the bit body.

The preforms are normally manufactured by hot pressing a layer of polycrystalline diamond material and a layer of tungsten carbide in a high pressure, high temperature press, usually with a cobalt catalyst. Methods of manufacturing such preforms are described, for example, in U.S. Pat. No. 4,259,090.

Such preform cutting elements are commonly in the form of circular discs, and further details of bits using such cutting elements can, for example, be seen from the U.S. Pat. No. 4,505,342.

However, all cutting elements of this type will, in use, eventually become ineffective as a result of wear, and a bit will have to be taken out of service after an unacceptable amount of wear has occurred. Normally, this point is reached long before half of each circular disc cutting element has worn away. In view of this, therefore, the cost of manufacturing the drill bits is sometimes reduced by using cutting elements which do not take the form of a complete circular disc, but which take the form of a semi-circular or half disc. Obviously, two such cutting elements can be obtained simply by cutting a conventional circular cutting element in half. These half disc cutting elements can be mounted on carriers, or directly on the bit body, in much the same fashion as circular cutting elements, and usually the curved edge of each semi-circular element will form the cutting edge and engage the formation in use.

However, when a half disc cutting element is mounted on a carrier, such as a stud, the element forms a sharp, right angled internal corner with the surface of the carrier on which it is mounted, usually by brazing. There appears, in use, to be a stress concentration in this area with the result that the carrier tends to fracture and fail as a result of cracking which originates in this area and then propagates through the thickness of the carrier.

Another problem is that the use of a half disc cutting element reduces the area of the surface of the element which is brazed to the carrier or the bit body. This reduces the shear strength of the bond, making it more susceptible to failure, and detachment of the cutting element.

One of the objects of the present invention is to provide a preform cutting element, and a method of manufacturing such an element, which can maintain the cost advantages given by half disc cutting elements, but which may overcome the problems described above.

Although, as previously mentioned, preform cutting elements of the kind to which the present invention relates usually comprise two layers, the invention is also applicable to preforms comprising more than two layers. In particular, co-pending British Patent Appln. No. 88-7875-3, from which the present application claims priority, describes cutting elements in which a further front layer of less hard material, usually again tungsten carbide, is bonded to the front face of the diamond layer and extends across at least the major part thereof. Since the less hard material of the further layer may have better toughness in tension than the diamond layer, this may enable the cutting element better to resist tensile stress and thus allow a more positive back-rake of the diamond layer to be used.

The present invention also provides a method of manufacturing preform cutting elements. Such method is suitable for the manufacture of cutting elements to overcome the cracking problems referred to above, but it is found that the method is also suitable for convenient manufacture of certain of the multi-layer preform cutting elements described in the aforesaid co-pending patent application.

SUMMARY OF THE INVENTION

According to the first aspect of the present invention, there is provided a preform cutting element for a rotary drill bit including a layer of superhard material having a front face and a rear face, the rear face of the superhard layer being bonded to the front face of a backing layer of less hard material, and the backing layer having a rear face the area of which is substantially greater than the area of the rear face of the superhard layer.

The superhard layer preferably comprises polycrystalline diamond material and the backing layer preferably comprises tungsten carbide.

Since the rear face of the backing layer, which, in use, is bonded to a carrier, is greater in area than the diamond layer, the backing layer may be readily shaped, dimensioned and positioned to avoid the stress concentration and risk of crack propagation which might otherwise occur at the junction between the backing layer and the surface of the carrier. However, since the diamond layer is, overall, smaller in area than the backing layer, the cutting element may be less costly to manufacture than conventional cutting elements where the diamond layer is coextensive with the backing layer, particularly if the methods to be described below are employed.

As previously mentioned, preform cutting elements of the kind to which the invention relates are normally manufactured by hot pressing the layer of polycrystalline diamond material and the layer of tungsten carbide in a high pressure, high temperature press. Accordingly, the above reference to the superhard or diamond layer being "bonded" to the backing layer is intended to refer only to the case where the superhard layer is bonded to the backing layer during the formation of the two layers in such a press. It is not intended to cover arrangements in which a preformed diamond, or other superhard, layer is subsequently mounted on a separately preformed backing layer, for example by brazing.

Preferably the area of the rear face of the superhard layer is less than 75% of the area of the rear face of the backing layer. For example, the area of the rear face of the superhard layer may be substantially half the area of the rear face of the backing layer. Thus, in a preferred embodiment, the backing layer may be substantially circular in configuration, the superhard layer being substantially semi-circular in configuration.

The front face of the superhard layer may be disposed in a different plane from the front face of the backing layer, so as to form a step. The front face of the backing layer may itself comprise two portions disposed in different planes so as to form a step between them, the superhard layer being bonded to one of said portions. Preferably, the superhard layer extends across substantially the whole of the front face of said one portion of the backing layer.

Where such a step is formed between two portions of the front face of the backing layer, the surface of the step is preferably inclined at an obtuse angle to both said surface portions. Alternatively or additionally the junction between the step and the lower of the two surface portions is concavely curved. Both said arrangements may reduce the stress concentration at the junction.

The cutting element may include further layers of material bonded to the superhard layer and/or to the backing layer. For example, as previously mentioned, the cutting element may include a front layer of less hard material bonded to the front face of the superhard layer and extending across at least the major part thereof.

According to a second aspect, the invention provides a method of manufacturing preform cutting elements comprising the steps of forming, in a high pressure, high temperature press, an intermediate structure comprising superhard material bonded between two outer layers of less hard material, the outer layers providing opposed outer faces respectively of the intermediate structure, and then cutting the intermediate structure to provide at least two pieces, each of said two pieces including part of the superhard material and at least a major part of a respective one of the two outer layers. Again, the superhard material preferably comprises polycrystalline diamond material, and the less hard material preferably comprises tungsten carbide.

Preferably the intermediate structure is cut substantially symmetrically, so that the two pieces are substantially similar.

The superhard material may be in the form of a single layer of material, the intermediate structure being divided into said two pieces by a cut at least a portion of which has a component extending in the direction of the thickness of the intermediate structure so as to divide the superhard layer into two.

In the case where the superhard material is in the form of a single layer of material, the intermediate structure may be divided into said two pieces by a cut having a first part substantially parallel to one face of the superhard layer, a second part which passes transversely through the superhard layer, and a third part which is substantially parallel to the other face of the superhard layer.

The first and third parts of the cut may be spaced from the adjacent faces of the superhard layer respectively, or may extend along said faces.

In an alternative arrangement, the superhard material is in the form of at least two layers of material which are spaced apart in the direction of the thickness of the intermediate structure, the intermediate structure being divided into said two pieces by a cut at least a portion of which has a component extending transversely to the thickness of the intermediate structure and between said layers of superhard material.

The invention includes within its scope a rotary drill bit of the kind first referred to and incorporating cutting elements of any of the kinds referred to above, or manufactured by any of the methods referred to above.

DETAILED DESCRIPTION OF THE PREFERRED EMBODIMENTS

Figure 1:
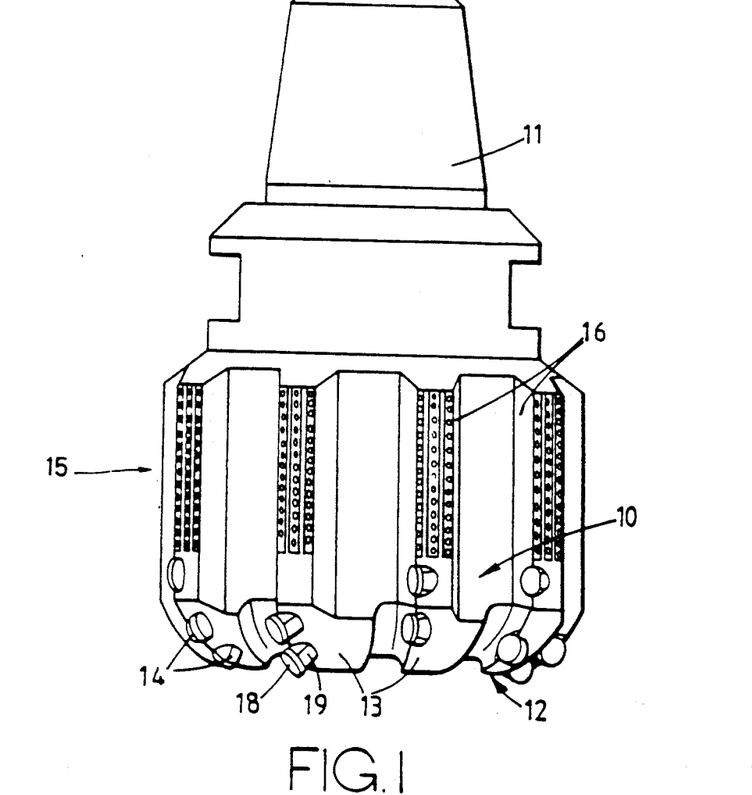
FIG. 1 is a side elevation of a typical drill bit of the kind to which the invention is applicable, and incorporating cutting elements in accordance with the invention.
Figure 2:
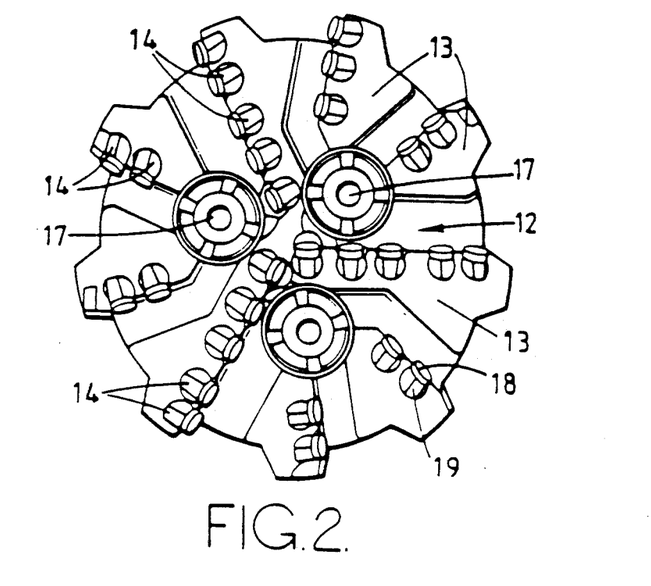
FIG. 2 is an end elevation of the drill bit shown in FIG. 4.

Referring to FIGS. 1 and 2, these show a full bore drill bit of the kind to which the present invention is applicable.

The bit body 10 is typically moulded from tungsten carbide matrix infiltrated with a binder alloy, and has a threaded shank 11 at one end for connection to the drill string.

The operative end face of the bit body is formed with a number of blades 13 radiating from the central area of the bit, the blades carrying cutting structures 14 spaced apart along the length thereof.

The bit gauge section 15 includes kickers 16 which contact the walls of the bore hole to stabilise the bit in the bore hole. A central passage (not shown) in the bit body and shank delivers drilling fluid through nozzles 17 to the end face 12 in known manner.

It will be appreciated that this is only one example of many possible variations of the type of bit to which the invention is applicable, including bits where the body is formed from steel.

In such drill bits, each cutting structure 14 comprises a preform cutting element mounted on a carrier in the form of a stud which is secured in a socket in the bit body. In the drill bit of FIGS. 1 and 2, the cutting structures 14 are of the kind shown in FIG. 13 and comprise a preform cutting element 118, formed by the method to be described, mounted on a carrier 130 in the form of a stud. However, the drill bit may alternatively incorporate cutting structures having cutting elements of any of the other forms according to the invention.

Figure 3:
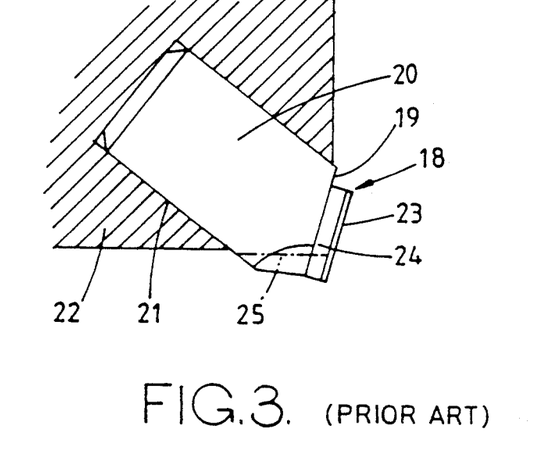
FIG. 3 is a diagrammatic side elevation of a conventional prior art cutting structure, comprising a circular cutting element mounted on a stud.

FIG. 3 is a diagrammatic side elevation of a typical prior art cutting structure which comprises a cutting element 18 bonded, usually by brazing, to a surface 19 on a generally cylindrical tungsten carbide stud 20 which is received in a socket 21 in a blade 22 formed on the operative end face of the bit body.

In the arrangement shown the cutting element 18 comprises a fully circular tablet or disc having a front facing layer 23 of polycrystalline diamond, providing the front cutting face of the element, bonded to a backing layer 24 of cemented tungsten carbide.

Such cutting structures wear in use of the bit so that a flat is formed on the outer projecting part of the cutting element and stud, for example as indicated in chain line at 25. In practice, the drill bit becomes inefficient and unusable when a significant number of the cutting structures on the surface of the bit become worn down to the sort of level indicated by the chain line 25. It will be seen, however, that when this point is reached only a comparatively small proportion of the cutting element has been worn away and the major part of the cutting element has played no part in the cutting operation.

In view of this, it has been proposed to save costs by using half-disc cutting elements which are generally semicircular in shape. It will be appreciated that two such cutting elements may be obtained by cutting a conventional circular cutting element in half, and although the cost of the cutting operation must be taken into account, each resulting half-disc cutting element is cheaper than a corresponding full-disc cutting element.

Figure 4:
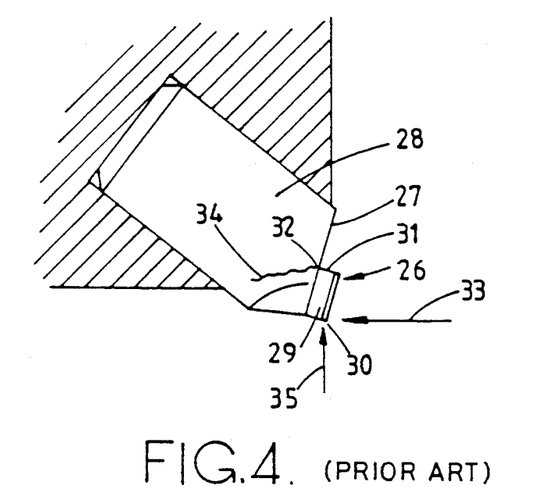
FIG. 4 is a similar view of an alternative prior art cutting structure, comprising a half-disc cutting element mounted on a stud.

FIG. 4 shows such a half-disc cutting element 26 mounted on a surface 27 of a stud 28. The curved portion of the peripheral surface 29 of the half-disc cutting element is outermost and provides the cutting edge 30 while the straight flat edge 31 of the cutting element is furthest from the formation being cut.

As will be seen from FIG. 4, this arrangement provides a sharp right-angled junction 32 between the straight flat surface 31 of the half-disc cutting element and the surface 27 of the stud, at the interface where the cutting element is brazed to the surface. It appears that this arrangement results in a stress concentration at the junction 32 as a result of cutting forces applied to the cutting structure in use, as indicated by the arrow 33. This stress concentration is found to initiate cracking in the area 32, and cutting structures of this kind are found to have a tendency to fail as a result of crack propagation through the stud as indicated diagrammatically at 34 in FIG. 4.

Furthermore, it will be apparent that the area of the rear surface of the half-disc cutting element 26 which is brazed to the surface 27 is of only half the area of the brazing surface in the full-disc arrangement of FIG. 3. This reduces the shear strength of the bond and increases the tendency of the bond to fail in shear as a result of weight-on-bit forces as indicated at 35 in FIG. 4.

Figure 5:
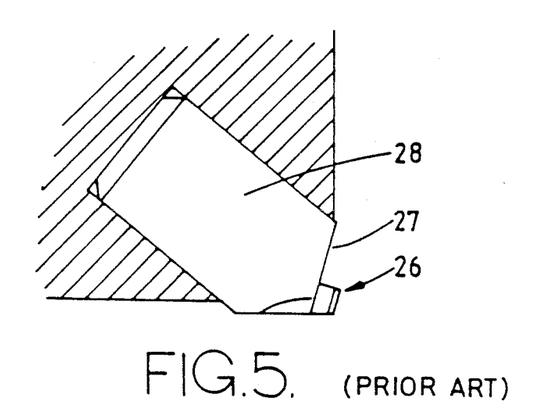
FIG. 5 is a similar view to FIG. 4, showing the prior art cutting structure after wear has occurred in use.

This tendency to fail in shear increases as the cutting structure wears in use. FIG. 5 illustrates the cutting structure of FIG. 4 after wear has occurred and it will be seen that this reduces the surface area of the bond between the cutting element 26 and the surface 27, thus further reducing its shear strength.

Figure 6:
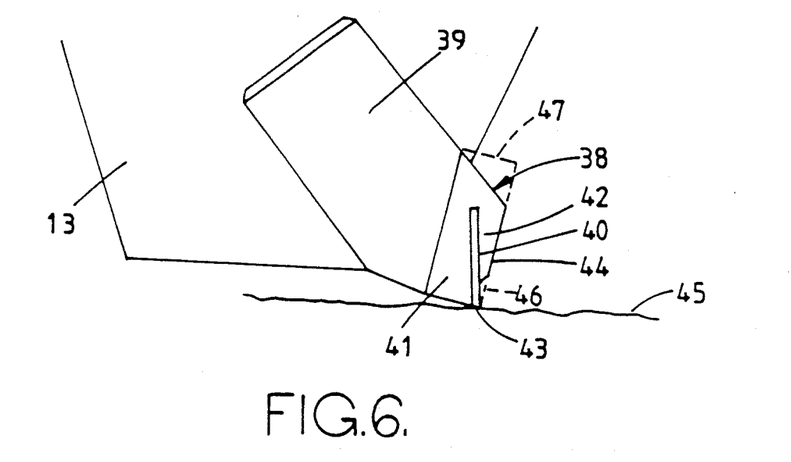
FIG. 6 is a diagrammatic side elevation of a cutting structure incorporating a cutting element according to the invention.

FIG. 6 illustrates diagrammatically a cutting element 38 according to the invention which comprises a polycrystalline diamond layer 40 of constant thickness embedded in cemented tungsten carbide which thereby provides a backing layer 41 bonded to the rear face of the diamond layer, and a front layer 42 bonded to the front face of the diamond layer. In accordance with the invention, the diamond layer 40 does not extend across the whole diameter of the cutting element so that the area of the rear face of the backing layer 41 is greater than the area of the rear face of the diamond layer 40. The front and rear tungsten carbide layers 41 and 42 extend across the upper peripheral edge of the diamond layer 40 to form a unitary body of material.

It will be seen that the front surface of the front layer 42 and the rear surface of the backing layer 41 are flat and substantially parallel. However, the diamond layer 40 extends at an acute angle to the front surface of the front layer 22 so that the diamond layer intersects the front surface of the front layer at the lower periphery thereof to form the cutting edge 43 of the cutting element.

In use, the part of the front layer 42 adjacent the cutting edge 43 is likely to erode away, as indicated at 46. This can provide a self-sharpening effect as the cutting element wears down.

There may be advantage in providing a cutting element which does not project beyond the peripheral boundary of the stud on which it is mounted, as viewed axially of the stud. For example, this may permit part of the cutting element to be received in the socket without the necessity of providing additional relief at the mouth of the socket to receive the projecting part of the cutting element. Such an arrangement is shown in FIG. 6. In order to achieve the necessary construction, it may be desirable to mount a complete circular cutting element on the inclined surface on the stud and then to remove, for example by grinding, those parts of the cutting element which project beyond the periphery of the stud, as viewed axially. FIG. 6 shows in dotted lines, at 47, the part of the circular tablet which must be ground off in such a case. It will be seen that the diamond layer 40 does not extend into the part of the cutting element which must be ground off, and this facilitates the grinding operation.

Figure 7:
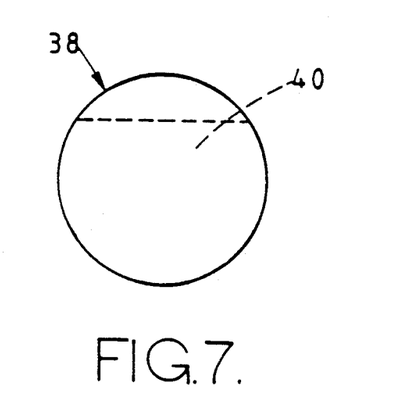
FIG. 7 is a front elevation of the cutting element of FIG. 6.

FIG. 7 is a front elevation of the circular cutting element 38 of FIG. 6, before the grinding off of the portion 47, and shows that the diamond layer 40 is generally in the form of a circle with a segment removed.

Figure 8:
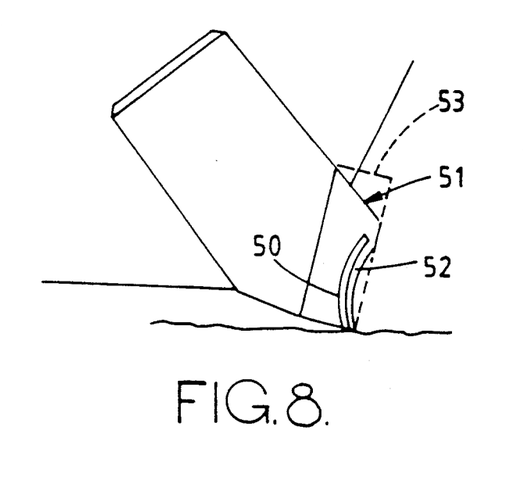
FIG. 8 is a diagrammatic side elevation of a further form of cutting structure incorporating a cutting element according to the invention.

FIG. 8 shows an alternative construction in which the diamond layer 50 of the cutting element 51 is curved so as to provide a concave front face and a convex rear face. The front layer 52 of the cutting element is similarly concavely curved.

Figure 9:
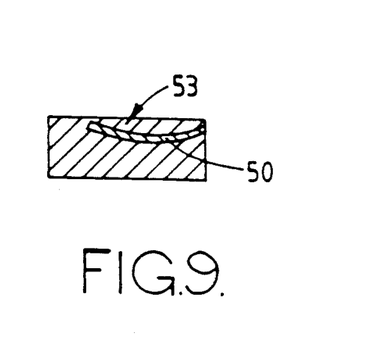
FIG. 9 is a diagrammatic section through an interim structure used in a process for manufacturing the cutting element of FIG. 8.

There is indicated in dotted lines at 53 the outline of the interim structure from which the cutting element 51 of FIG. 8 has been formed, and the interim structure is also shown in FIG. 9. It will be seen from FIG. 9 that the interim structure 53 comprises overall a circular tablet of constant thickness having flat parallel end faces. The main body of the tablet is formed from cemented tungsten carbide and the polycrystalline diamond layer is embedded within the main body of tungsten carbide. Such an interim structure may be formed in a conventional high pressure, high temperature press of the type normally used for the hot pressing of two-layer polycrystalline diamond and tungsten carbide preforms. Such an element may be manufactured using the known techniques.

The element of FIG. 9 may be used without further modification and the cutting element of FIG. 6 would be formed by a similar process. However, in the arrangement of FIG. 8 part of the front face of the element 53 has been ground away so that the front layer 52 is thinner and provides a concave front face to the cutting element 51.

The front layer 52 might be further ground away to reveal part of the front face of the diamond layer 50 or it may be wholly ground away to reveal the whole of the front face of the diamond layer 50.

FIGS. 10–15 illustrate a further improved form of cutting element, and also a method of manufacturing such an element which may provide a significant cost advantage when compared with conventional full-disc cutting elements.

Figure 10:
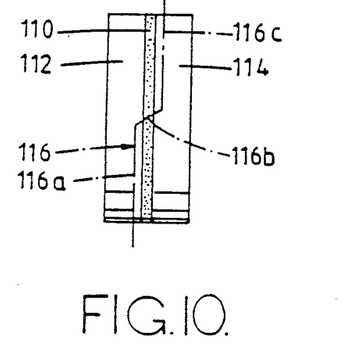
FIG. 10 is a side elevation of a preform intermediate structure from which two cutting elements can be made, in accordance with the invention, by cutting along the chain line.

FIG. 10 shows an intermediate structure for use in the manufacture of two cutting elements in accordance with the invention. The structure is generally in the form of a circular tablet or disc and comprises a layer 110 of polycrystalline diamond, to the two broad faces respectively of which are bonded somewhat thicker layers 112 and 114 of cemented tungsten carbide. Such a structure can be made in accordance with well known technology, and more specifically in the manner that traditional fully circular preform cutting elements are made, except that there are two layers 112 and 114 of tungsten carbide located on and bonded to respective faces of the polycrystalline diamond layer 110, rather than only a single tungsten carbide layer.

Figure 11:
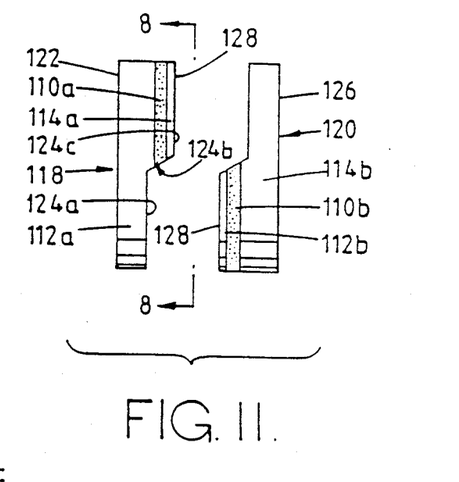
FIG. 11 is a side elevation of the structure of FIG. 10 after it has been cut and separated into two pieces.

In accordance with the present invention, two cutting elements can be formed from the intermediate structure of FIG. 10 by cutting along the chain line 116. The two resulting cutting elements are shown in FIG. 11 as items 118 and 120 respectively. It will be noted that the cutting line 116 has three parts: a first part 116a extends parallel to the broad faces of the layers 110, 112 and 114 and is positioned within layer 112, spaced from the adjacent surface of the diamond layer 110. This part 116a extends slightly less than half way across the structure. At that point, the cutting direction changes, through part 116b, which is angled so that it continues diametrically across the preform but also passes through the diamond layer 110 and slightly into the tungsten carbide layer 114. The upper end of the part 116b of the cut is located an equal distance from the top of the structure as its lower end is from the bottom. The top of the part 116b intersects the third part 116c of the cutting line, which, like part 116a, extends parallel to the broad faces of the layers of the structure, but spaced slightly from the adjacent face of the diamond layer 110.

Figure 12:
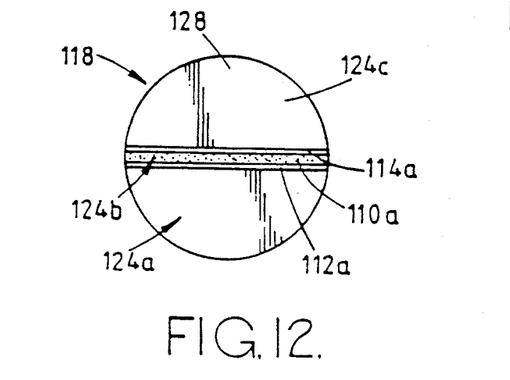
FIG. 12 is a front elevation of one of the cutting elements of FIG. 11 without lapping or other removal of the thin forward most tungsten carbide layer (to be described more fully below)

After cutting, each of the elements 118 and 120 has a disc shape, i.e. defines a full circle, when viewed from the front or rear, as shown in the front view of the element 118 shown in FIG. 12. However, as best seen in FIG. 11, the thickness and composition of the cutting element 118 varies. More specifically, while the rear surface 122 of the element 118 is a planar surface, the front surface is a stepped surface including an innermost part 124a lying parallel to the rear surface 122, a bevelled step 124b, and a planar surface 124c, likewise lying parallel to, but further from, the rear surface 122.

It can also be seen that the element 118 includes portions of each of the three original layers 110, 112 and 114. More specifically, the rear layer 112a of the element includes the full thickness of layer 112 in its upper portion (the portion which, in use, engages the formation being cut) and parts of layer 112 of reduced thickness along the lowermost part of the step 124b as well as along the part 124a of the front surface. The uppermost or outermost part of the cutting element 118 also includes a generally semi-circular or half-disc-shaped portion 110a of the full thickness of the original diamond layer 110. Overlying the layer 110a along the outermost part of the front surface 124c is a thin layer of tungsten carbide 114a taken from the original layer 114.

The cutting element 120 is identical to the cutter 118, but is (as first cut) reversed in orientation, with its various parts being formed by the remainders of the three original layers 110, 112 and 114. Briefly, cutting element 120 has a planar rear face 126 and a stepped front face 128, along which the thickness of the cutting element as a whole varies. The rearmost layer of the element 120 includes a full circle portion 114b of tungsten carbide layer 114, the thickness of which is reduced along the innermost (in use) or uppermost (in FIG. 11) part of the cutting element, a semi-circular shaped full thickness portion 110b of the original diamond layer 110, and a thin semi-circular shaped layer 112b from the original tungsten carbide layer 112. Herein, unless otherwise noted, terms such as "outer" or "forward" refer to the orientation of the cutting element in use on a bit intended for rotation in a given direction as well known in the art.

If desired, the forwardmost thin tungsten carbide layers 114a and 112b of the cutting elements 118 and 120 respectively can be removed, for example by lapping, so that the diamond layers 110a and 110b are exposed on the forwardmost faces of the cutters from the outset. FIG. 14 shows the cutting element 118 after such lapping. However, in some instances it may be desirable to leave the layers 114a and 112b in place, and to allow them to be gradually worn away during drilling, in accordance with the invention described in co-pending British Patent Appln. No. 8807875-3 from which the present application claims priority. It should be appreciated that the outermost portions of these layers, along the curves thereof, for example at 128 in FIGS. 11, 12 and 13, will very quickly wear away when drilling commences, so that a very hard cutting edge will be presented by the underlying diamond layer 110a.

Figure 13:
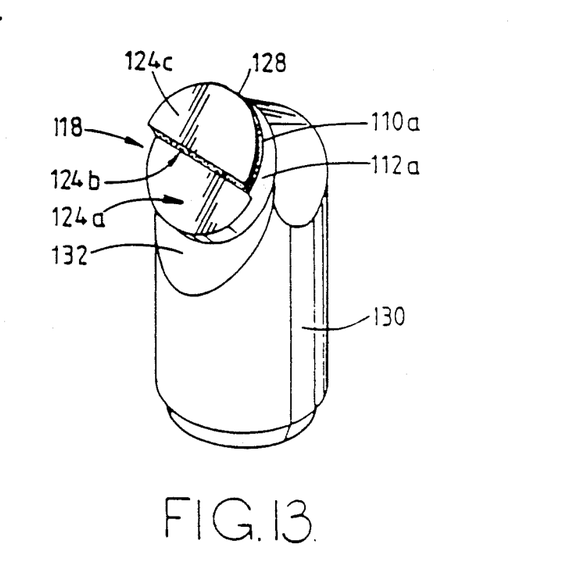
FIG. 13 is a perspective view showing how the cutting element of FIG. 12 could be mounted on a stud, which in turn can be mounted on a drill bit body.
Figure 14:
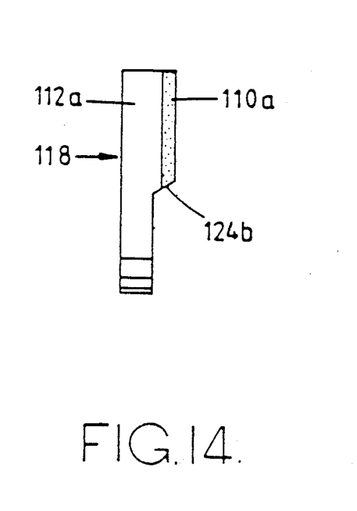
FIG. 14 is a side elevation of one of the cutting elements formed in accordance with FIGS. 10 and 11 but with the thin forwardmost layer of tungsten carbide having been removed, as by lapping.

FIG. 13 shows the cutting element 118 mounted on a carrier in the form of a stud 130, and more specifically on a planar angular surface 132 formed on the forward side of the stud 130 near its outermost end. It can be seen that, as thus positioned, the semi-circular layers 110a and 114a are disposed outermost and forwardmost, and their curved surfaces are presented at the free end of the stud to form the cutting edge.

Because the step 124b forms an obtuse angle at its internal corner with the innermost portion 124a of the forward face of the cutter 118, and possibly also because that corner is formed within the monolithic layer 112a of tungsten carbide rather than at the interface between the cutting element and the surface of the stud, the danger of crack initiation at such internal corner is greatly reduced. Also, since the rear surface 122 of the cutting element is fully circular, the bond area is the same as for an equivalent conventional full-disc cutting element and there is therefore no loss in shear strength of the bond, when compared with such a full-disc cutter.

Furthermore, even though the original intermediate structure of FIG. 10 utilises as much tungsten carbide as two conventional fully circular disc cutting elements, it only uses half as much polycrystalline diamond. Also, the axial length or thickness of the intermediate structure is less than the combined thickness of two conventional fully circular cutting elements, and thus it takes up less space in the high temperature, high pressure press in which such elements are formed. Consequently, it may be possible to manufacture more cutting elements in each press operation, thereby reducing the cost. Thus, the cutting element structure and method of manufacture described may retain much of the cost effectiveness of using simpler half-disc type cutters, but without the aforementioned problems associated with the use of those cutters in practice.

Figure 15:
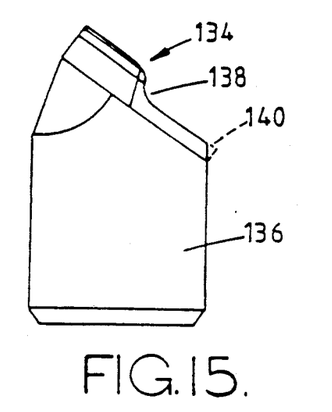
FIG. 15 is a side elevation of a further form of cutting element, in accordance with the invention, mounted on a stud.

FIG. 15 is a side elevation of an alternative form of cutting element 134, manufactured in accordance with the invention and mounted on a stud 136.

The element 134 is initially somewhat similar to the elements 118 and 120 but in this case the central portion of the cut which divides the intermediate structure follows a generally S-shaped path so that the step between the two parts of the cutting element is internally radiussed, as indicated at 138. This further reduces the risk of crack initiation.

In the particular construction illustrated the portions of the cutting element 134 which project beyond the periphery of the stud 136 as viewed axially, such portions being indicated in dotted line at 140 in FIG. 15, are ground off after the cutting element 134 has been mounted on the stud 136, for example by brazing.

Figure 16:
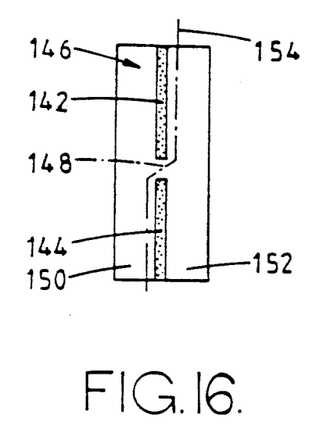
FIG. 16 is a side elevation of an alternative form of intermediate structure from which two cutting elements may be made.
Figure 17:
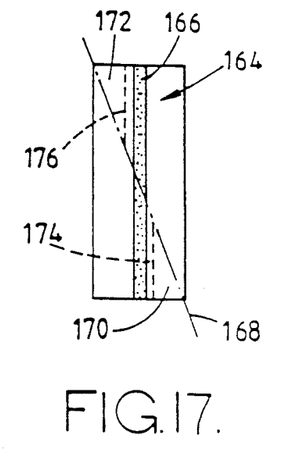
FIG. 17 is a similar view of a further form of intermediate structure.
Figure 19:
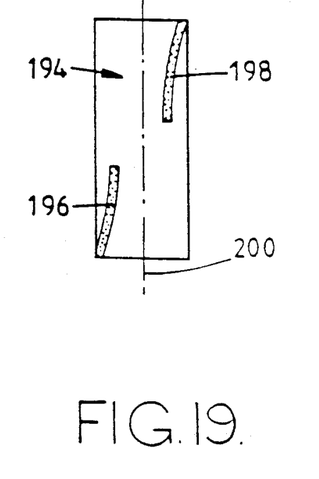
FIG. 19 is a side elevation of a still further form of intermediate structure.

FIGS. 16, 17 and 19 are similar views to FIG. 10 showing further alternative forms of intermediate structure from which two cutting elements may be made.

In the arrangement of FIG. 16, the diamond layer is formed in two coplanar portions 142 and 144, the two portions being spaced apart on opposite sides of a diameter of the intermediate structure 146 to provide an elongate gap 148 which is filled with tungsten carbide and connects the two outer layers 150 and 152. Such arrangement facilitates the cutting of the intermediate structure into two pieces since the cutting line 154 does not have to pass through polycrystalline diamond material but only through tungsten carbide. This speeds up the cutting process and hence reduces its cost. In all of the arrangements described the intermediate structure may be cut into two pieces using techniques, such as electron discharge machining, which are well known and do not therefore require to be described in detail.

As previously described, the thin layer of tungsten carbide which is left on the forward side of the diamond layer may be left in place, or may be removed, for example by lapping. In a further alternative, however, the cut may be accurately positioned so that it passes exactly along the interface between the diamond layer and the adjacent tungsten carbide layer, so that the surface of the diamond layer is exposed in the cutting element as initially cut. The exposed surface of the diamond layer may then be lapped, although in some cases, depending on the cutting method used and the method of manufacture of the original structure, the exposed surface of the diamond layer may already be of sufficient quality to obviate further lapping.

In the alternative arrangement of FIG. 17 the intermediate structure 164 incorporates a single diamond layer 166 and the structure is divided into two pieces by a straight cut 168 which, as viewed in FIG. 17, extends diagonally from one peripheral edge of the structure to the opposite peripheral edge. In this case the forward surface of each portion of the diamond layer will have bonded to it a generally wedge-shaped section of tungsten carbide as indicated at 170 and 172 in FIG. 17. This may be subsequently removed by grinding, either totally, so as to expose the forward face of the diamond layer, or down to the chain lines indicated at 174 and 176 in FIG. 17, so as to leave a thin layer of tungsten carbide in front of the diamond layer.

Although, as viewed in FIG. 17, the inclined line of cut 168 is shown as passing exactly through the opposite peripheral edges of the intermediate structure, it will be appreciated that this is not essential and the line of cut might intersect the opposite flat faces of the intermediate structure inwardly of the peripheral edge, or, alternatively, might intersect only the peripheral surface of the intermediate structure. Although it is desirable for the cut to be symmetrical so as to produce two substantially identical cutting elements, the invention does not exclude arrangements where the cut is not symmetrically located and thus produces two cutting elements of different sizes.

Figure 18:
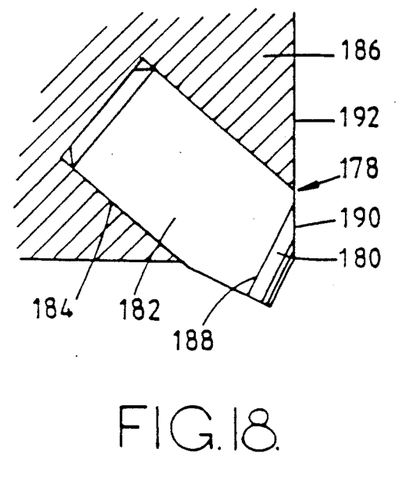
FIG. 18 is a diagrammatic side elevation of a cutting structure utilising a cutting element produced from the intermediate structure of FIG. 17.

FIG. 18 is a diagrammatic side elevation of a cutting structure 178 utilising a cutting element manufactured by the method according to FIG. 17. In this case the cutting element 180 is bonded to a stud 182 received in a socket 184 in a blade 186 on the bit body. The stud 182 is so positioned and orientated, and the surface 188 on which the cutting element is mounted is also so orientated, that the inclined surface 190 of the cutting element 180 is substantially co-planar with the leading surface 192 of the blade 186. Such arrangement may have the advantage that it does not provide significant discontinuities on the leading surface of the blade where debris may lodge or which may encourage erosion of the bit body.

The present invention also provides a convenient method of forming cutting elements in accordance with FIGS. 8 and 9. FIG. 19 illustrates an example of how such two cutting elements can be so manufactured.

In this case the intermediate structure 194 comprises a circular disc of tungsten carbide in which are embedded two curved diamond layers 196 and 198, the two diamond layers being spaced apart both diametrically and with respect to the thickness of the intermediate structure. The intermediate structure may then be cut into two pieces by a straight cut as indicated at 200. Each of the two pieces then comprises a cutting element, or a body suitable for conversion to a cutting element.

Although the primary object of the method according to the invention is to produce two cutting elements from an intermediate structure, the invention does not exclude methods where the intermediate structure is cut into more than two pieces, provided that these include two pieces having the required characteristics.

Also, although the intermediate structure may be used in the form in which it emerges from the press, in some cases a plurality of intermediate structures may be obtained by cutting into pieces a single larger element manufactured in the press.

We claim:

1. A method of manufacturing preform cutting elements comprising the steps of forming, in a high pressure, high temperature press, an intermediate structure comprising superhard material bonded between two outer layers of less hard material, the outer layers providing opposed outer faces respectively of the intermediate structure, and then cutting the intermediate structure to provide at least two pieces, each of said two pieces including part of the superhard material and at least a major part of a respective one of the two outer layers.

2. A method according to claim 1, wherein the intermediate structure is cut substantially symmetrically so that the two pieces are substantially similar.

3. A method according to claim 1, wherein the superhard material is in the form of a single layer of material, the intermediate structure being divided into said two pieces by a cut at least a portion of which has a component extending in the direction of the thickness of the intermediate structure so as to divide the superhard layer into two.

4. A method according to claim 3, wherein the intermediate structure is divided into said two pieces by a cut having a first part substantially parallel to one face of the superhard layer, a second part which passes transversely through the superhard layer, and a third part which is substantially parallel to the other face of the superhard layer.

5. A method according to claim 4, wherein said first and third parts of the cut are spaced from the adjacent faces of the superhard layer respectively.

6. A method according to claim 4, wherein said first and third parts of the cut extend along the adjacent faces of the superhard layer respectively.

7. A method according to claim 1, wherein the superhard material is in the form of at least two layers of material which are spaced apart in the direction of the thickness of the intermediate structure, the intermediate structure being divided into said two pieces by a cut at least a portion of which has a component extending transversely to the thickness of the intermediate structure and between said layers of superhard material.

* * * * *